United States Patent
Gutta et al.

(10) Patent No.: US 8,063,992 B2
(45) Date of Patent: *Nov. 22, 2011

(54) DOMINANT COLOR EXTRACTION FOR AMBIENT LIGHT DERIVED FROM VIDEO CONTENT MAPPED THROUGH UNRENDERED COLOR SPACE

(75) Inventors: Srinivas Gutta, Bangalore (IN); Mark J. Elting, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1309 days.

This patent is subject to a terminal disclaimer.

(21) Appl. No.: 11/571,284

(22) PCT Filed: Jun. 27, 2005

(86) PCT No.: PCT/IB2005/052121
§ 371 (c)(1),
(2), (4) Date: Dec. 26, 2006

(87) PCT Pub. No.: WO2006/003602
PCT Pub. Date: Jan. 12, 2006

(65) Prior Publication Data
US 2008/0094515 A1    Apr. 24, 2008

Related U.S. Application Data

(60) Provisional application No. 60/584,197, filed on Jun. 30, 2004.

(51) Int. Cl.
*H04N 5/57* (2006.01)
*H04N 5/58* (2006.01)
(52) U.S. Cl. ......... 348/603; 348/602; 348/553; 348/739
(58) Field of Classification Search ................. 348/603, 348/602, 553, 739, 818
See application file for complete search history.

(56) References Cited

U.S. PATENT DOCUMENTS
3,571,497 A * 3/1971 Butterfield ............... 348/32
6,611,297 B1 * 8/2003 Akashi et al. ............ 348/739

FOREIGN PATENT DOCUMENTS
JP   06-076958 A    3/1994
JP   06-267664 A   12/1994
WO   03101098 A1  12/2003

* cited by examiner

*Primary Examiner* — Michael Lee

(57) ABSTRACT

Extracting and processing video content encoded in a rendered color space to be emulated by an ambient light source, comprising extracting dominant color information from a video signal and transforming the color information through unrendered color space using tristimulus primary matrices to form a second rendered color space for ambient distribution. Steps include quantizing the rendered color space to form an assigned color distribution, such as by reducing possible color states, or binning to form superpixels; and selecting a dominant color using a mode, mean, median, or weighted average of pixel chromaticities. A color of interest can be further analyzed to produce a true dominant color, and past video frames can guide selection of dominant colors in future frames.

20 Claims, 15 Drawing Sheets

$$R_{avg} = \frac{\sum_{i=1 \ j=1}^{n, m} R_{ij}}{n \times m}$$

$$\begin{bmatrix} X \\ Y \\ Z \end{bmatrix} = \begin{bmatrix} X_{r,max} & X_{g,max} & X_{b,max} \\ Y_{r,max} & Y_{g,max} & Y_{b,max} \\ Z_{r,max} & Z_{g,max} & Z_{b,max} \end{bmatrix} \begin{bmatrix} R \\ G \\ B \end{bmatrix}$$

$M \nearrow$

FIG. 5
PRIOR ART $$\begin{bmatrix} X \\ Y \\ Z \end{bmatrix} = M_1 * \begin{bmatrix} R \\ G \\ B \end{bmatrix}$$

FIG. 6

$$\begin{bmatrix} X \\ Y \\ Z \end{bmatrix} = M_2 * \begin{bmatrix} R' \\ G' \\ B' \end{bmatrix}$$

$$\begin{bmatrix} R' \\ G' \\ B' \end{bmatrix} = M_2^{-1} * M_1 * \begin{bmatrix} R \\ G \\ B \end{bmatrix}$$

FIG. 8

$$M = \begin{bmatrix} S_r X_r & S_g X_g & S_b X_b \\ S_r Y_r & S_g Y_g & S_b Y_b \\ S_r Z_r & S_g Z_g & S_b Z_b \end{bmatrix}$$

FIG. 9
PRIOR ART $$\begin{bmatrix} S_r \\ S_g \\ S_b \end{bmatrix} = \begin{bmatrix} X_w \\ Y_w \\ Z_w \end{bmatrix} \begin{bmatrix} X_r & X_g & X_b \\ Y_r & Y_g & Y_b \\ Z_r & Z_g & Z_b \end{bmatrix}^{-1}$$

FIG. 10
PRIOR ART $$\begin{bmatrix} S_r \\ S_g \\ S_b \end{bmatrix} \begin{bmatrix} X_r & X_g & X_b \\ Y_r & Y_g & Y_b \\ Z_r & Z_g & Z_b \end{bmatrix} = \begin{bmatrix} X_w \\ Y_w \\ Z_w \end{bmatrix}$$

FIG. 11
PRIOR ART

FIG. 20

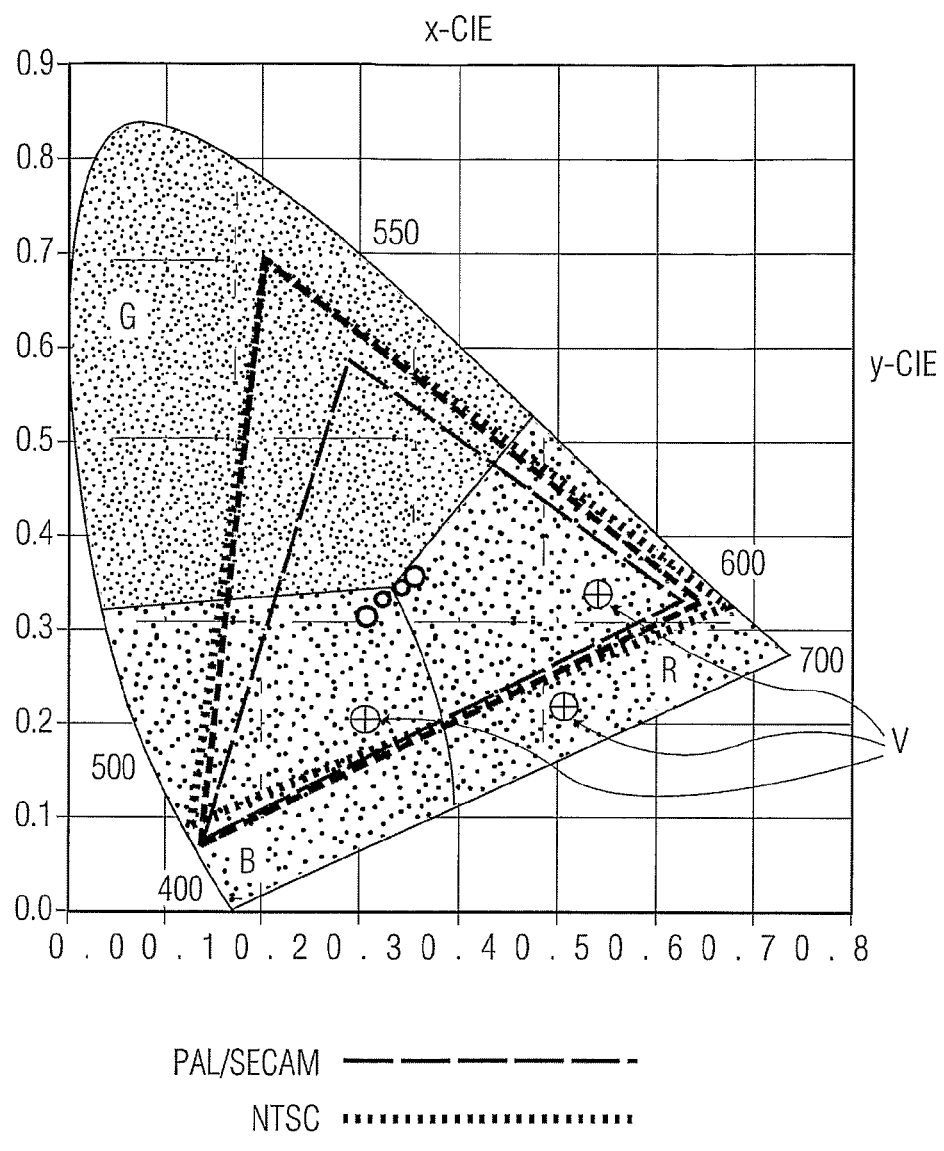
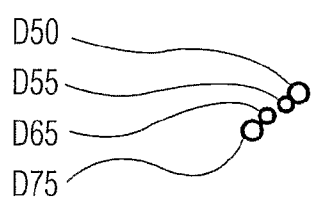
FIG. 25

$$R_{avg} = \frac{\sum_{i=1 \, j=1}^{n, m} W_{ij} \, R_{ij}}{n \times m}$$

$$R_{avg} = \frac{\sum_{i=1 \, j=1}^{n, m} W(i, j, R) \, R_{ij}}{n \times m}$$

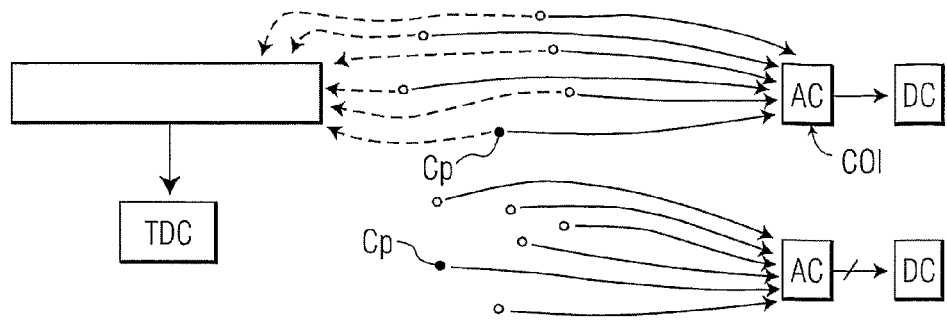
FIG. 31
FIG. 32
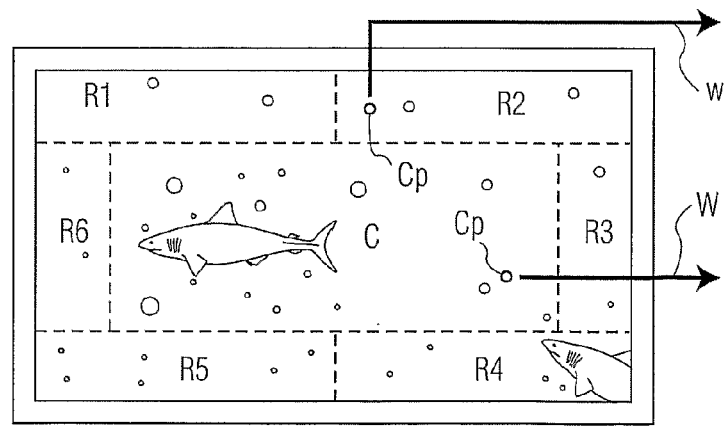
FIG. 33

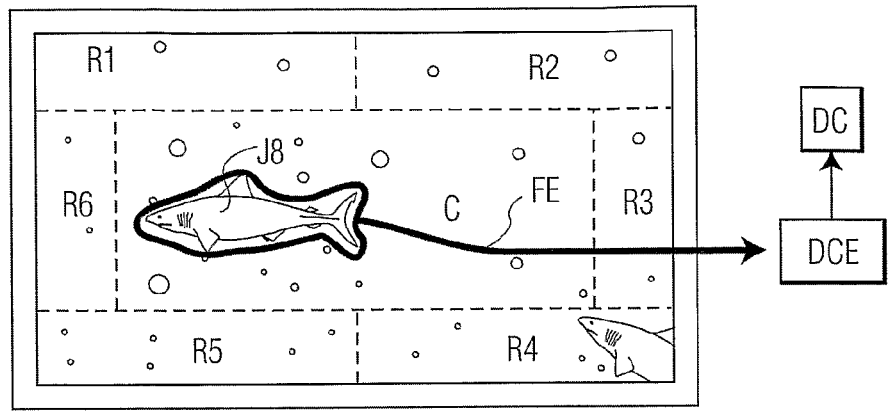
FIG. 34
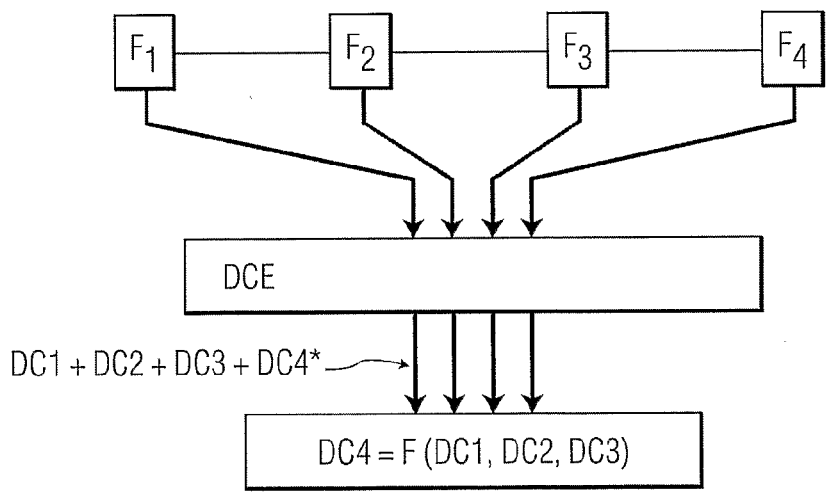
FIG. 35
↓
↓
FIG. 36

DOMINANT COLOR EXTRACTION FOR AMBIENT LIGHT DERIVED FROM VIDEO CONTENT MAPPED THROUGH UNRENDERED COLOR SPACE

CROSS REFERENCE TO RELATED CASES

Applicant(s) claim(s) the benefit of Provisional Application Ser. No. 60/584,197, filed Jun. 30, 2004.

This invention relates to production and setting of ambient lighting effects using multiple light sources, and typically based on, or associated with, video content, such as from a video display. More particularly, it relates to a method to extract dominant color information from sampled or subsampled video in real time, and to perform color mapping transformations from the color space of the video content to that which best allows driving a plurality of ambient light sources.

Engineers have long sought to broaden the sensory experience obtained consuming video content, such as by enlarging viewing screens and projection areas, modulating sound for realistic 3-dimensional effects, and enhancing video images, including broader video color gamuts, resolution, and picture aspect ratios, such as with high definition (HD) digital TV television and video systems. Moreover, film, TV, and video producers also try to influence the experience of the viewer using visual and auditory means, such as by clever use of color, scene cuts, viewing angles, peripheral scenery, and computer-assisted graphical representations. This would include theatrical stage lighting as well. Lighting effects, for example, are usually scripted—synchronized with video or play scenes—and reproduced with the aid of a machine or computer programmed with the appropriate scene scripts encoded with the desired schemes.

In the prior art digital domain, automatic adaptation of lighting to fast changes in a scene, including unplanned or unscripted scenes, has not been easy to orchestrate in large part because of the overhead of large high bandwidth bit streams required using present systems.

Philips (Netherlands) and other companies have disclosed means for changing ambient or peripheral lighting to enhance video content for typical home or business applications, using separate light sources far from the video display, and for many applications, some sort of advance scripting or encoding of the desired lighting effects. Ambient lighting added to a video display or television has been shown to reduce viewer fatigue and improve realism and depth of experience.

Sensory experiences are naturally a function of aspects of human vision, which uses an enormously complex sensory and neural apparatus to produce sensations of color and light effects. Humans can distinguish perhaps 10 million distinct colors. In the human eye, for color-receiving or photopic vision, there are three sets of approximately 2 million sensory bodies called cones which have absorption distributions which peak at 445, 535, and 565 nm light wavelengths, with a great deal of overlap. These three cone types form what is called a tristimulus system and are called B (blue), G (green), and R (red) for historical reasons; the peaks do not necessarily correspond with those of any primary colors used in a display, e.g., commonly used RGB phosphors. There is also interaction for scotopic, or so-called night vision bodies called rods. The human eye typically has 120 million rods, which influence video experiences, especially for low light conditions such as found in a home theatre.

Color video is founded upon the principles of human vision, and well known trichromatic and opponent channel theories of human vision have been incorporated into our understanding of how to influence the eye to see desired colors and effects which have high fidelity to an original or intended image. In most color models and spaces, three dimensions or coordinates are used to describe human visual experience.

Color video relies absolutely on metamerism, which allows production of color perception using a small number of reference stimuli, rather than actual light of the desired color and character. In this way, a whole gamut of colors is reproduced in the human mind using a limited number of reference stimuli, such as well known RGB (red, green, blue) tristimulus systems used in video reproduction worldwide. It is well known, for example, that nearly all video displays show yellow scene light by producing approximately equal amounts of red and green light in each pixel or picture element. The pixels are small in relation to the solid angle they subtend, and the eye is fooled into perceiving yellow; it does not perceive the green or red that is actually being broadcast.

There exist many color models and ways of specifying colors, including well known CIE (Commission Internationale de l'Eclairage) color coordinate systems in use to describe and specify color for video reproduction. Any number of color models can be employed using the instant invention, including application to unrendered opponent color spaces, such as the CIE L*U*V* (CIELUV) or CIE L*a*b* (CIELAB) systems. The CIE established in 1931 a foundation for all color management and reproduction, and the result is a chromaticity diagram which uses three coordinates, x, y, and z. A plot of this three dimensional system at maximum luminosity is universally used to describe color in terms of x and y, and this plot, called the 1931 x,y chromaticity diagram, is believed to be able to describe all perceived color in humans. This is in contrast to color reproduction, where metamerism is used to fool the eye and brain. Many color models or spaces are in use today for reproducing color by using three primary colors or phosphors, among them Adobe RGB, NTSC RGB, etc.

It is important to note, however, that the range of all possible colors exhibited by video systems using these tristimulus systems is limited. The NTSC (National Television Standards Committee) RGB system has a relatively wide range of colors available, but this system can only reproduce half of all colors perceivable by humans. Many blues and violets, blue-greens, and oranges/reds are not rendered adequately using the available scope of traditional video systems.

Furthermore, the human visual system is endowed with qualities of compensation and discernment whose understanding is necessary to design any video system. Color in humans can occur in several modes of appearance, among them, object mode and illuminant mode.

In object mode, the light stimulus is perceived as light reflected from an object illuminated by a light source. In illuminant mode, the light stimulus is seen as a source of light. Illuminant mode includes stimuli in a complex field that are much brighter than other stimuli. It does not include stimuli known to be light sources, such as video displays, whose brightness or luminance is at or below the overall brightness of the scene or field of view so that the stimuli appear to be in object mode.

Remarkably, there are many colors which appear only in object mode, among them, brown, olive, maroon, grey, and beige flesh tone. There is no such thing, for example, as a brown illuminant source of light, such as a brown-colored traffic light.

For this reason, ambient lighting supplements to video systems which attempt to add object colors cannot do so using direct sources of bright light. No combination of bright red and green sources of light at close range can reproduce brown or maroon, and this limits choices considerably. Only spectral colors of the rainbow, in varying intensities and saturation, can be reproduced by direct observation of bright sources of light. This underscores the need for fine control over ambient lighting systems, such as to pro vide low intensity luminance output from light sources with particular attention to hue management. This fine control is not presently addressed in a way that permits fast changing and subtle ambient lighting under present data architectures.

Video reproduction can take many forms. Spectral color reproduction allows exact reproduction of the spectral power distributions of the original stimuli, but this is not realizable in any video reproduction that uses three primaries. Exact color reproduction can replicate human visual tristimulus values, creating a metameric match to the original, but overall viewing conditions for the picture and the original scene must be similar to obtain a similar appearance. Overall conditions for the picture and original scene include the angular subtense of the picture, the luminance and chromaticity of the surround, and glare. One reason that exact color reproduction often cannot be achieved is because of limitations on the maximum luminance that can be produced on a color monitor.

Colorimetric color reproduction provides a useful alternative where tristimulus values are proportional to those in the original scene. Chromaticity coordinates are reproduced exactly, but with proportionally reduced luminances. Colorimetric color reproduction is a good reference standard for video systems, assuming that the original and the reproduced reference whites have the same chromaticity, the viewing conditions are the same, and the system has an overall gamma of unity. Equivalent color reproduction, where chromaticity and luminances match the original scene cannot be achieved because of the limited luminance generated in video displays.

Most video reproduction in practice attempts to achieve corresponding color reproduction, where colors reproduced have the same appearance that colors in the original would have had if they had been illuminated to produce the same average luminance level and the same reference white chromaticity as that of the reproduction. Many, however, argue that the ultimate aim for display systems is in practice preferred color reproduction, where preferences of the viewer influence color fidelity. For example, suntanned skin color is preferred to average real skin color, and sky is preferred bluer and foliage greener than they really are. Even if corresponding color reproduction is accepted as a design standard, some colors are more important than others, such as flesh tones, the subject of special treatment in many reproduction systems such as the NTSC video standard.

In reproducing scene light, chromatic adaptation to achieve white balance is important. With properly adjusted cameras and displays, whites and neutral grays are typically reproduced with the chromaticity of CIE standard daylight illuminant D65. By always reproducing a white surface with the same chromaticity, the system is mimicking the human visual system, which inherently adapts perceptions so that white surfaces always appear the same, whatever the chromaticity of the illuminant, so that a white piece of paper will appear white, whether it is found in a bright sunlight day at the beach, or a incandescent-lit indoor scene. In color reproduction, white balance adjustment usually is made by gain controls on the R, G, and B channels.

The light output of a typical color receiver is typically not linear, but rather follows a power-law relationship to applied video voltages. The light output is proportional to the video-driving voltage raised to the power gamma, where gamma is typically 2.5 for a color CRT (cathode ray tube), and 1.8 for other types of light sources. Compensation for this factor is made via three primary gamma correctors in camera video processing amplifiers, so that the primary video signals that are encoded, transmitted and decoded are in fact not R, G, and B, but $R^{1/\gamma}$, $G^{1/\gamma}$, and $B^{1/\gamma}$. Colorimetric color reproduction requires that the overall gamma for video reproduction—including camera, display, and any gamma-adjusting electronics be unity, but when corresponding color reproduction is attempted, the luminance of the surround takes precedence. For example, a dim surround requires a gamma of about 1.2, and a dark surround requires a gamma of about 1.5 for optimum color reproduction. Gamma is an important implementation issue for RGB color spaces.

Most color reproduction encoding uses standard RGB color spaces, such as sRGB, ROMM RGB, Adobe RGB 98, Apple RGB, and video RGB spaces such as that used in the NTSC standard. Typically, an image is captured into a sensor or source device space, which is device and image specific. It may be transformed into an unrendered image space, which is a standard color space describing the original's colorimetry (see Definitions section).

However, video images are nearly always directly transformed from a source device space into a rendered image space (see Definitions section), which describes the color space of some real or virtual output device such as a video display. Most existing standard RGB color spaces are rendered image spaces. For example, source and output spaces created by cameras and scanners are not CIE-based color spaces, but spectral spaces defined by spectral sensitivities and other characteristics of the camera or scanner.

Rendered image spaces are device-specific color spaces based on the colorimetry of real or virtual device characteristics. Images can be transformed into rendered spaces from either rendered or unrendered image spaces. The complexity of these transforms varies, and can include complicated image dependent algorithms. The transforms can be non-reversible, with some information of the original scene encoding discarded or compressed to fit the dynamic range and gamut of a specific device.

There is currently only one unrendered RGB color space that is in the process of becoming a standard, ISO RGB defined in ISO 17321, most often used for color characterization of digital still cameras. In most applications today, images are converted into a rendered color space for either archiving and data transfer, including video signals. Converting from one rendered image or color space to another can cause severe image artifacts. The more mismatched the gamuts and white points are between two devices, the stronger the negative effects.

One shortcoming in prior art ambient light display systems is that extraction from video content of representative colors for ambient broadcast can be problematic. For example, color-averaging of pixel chromaticities often results in grays, browns, or other color casts that are not perceptually representative of a video scene or image. Colors derived from simple averaging of chromaticities often look smudged and wrongly chosen, particularly when contrasted to an image feature (e.g., a bright fish) or a dominant background (e.g., blue sky).

Another problem in prior art ambient light display systems is that no specific method is given to provide for synchronous real time operation to transform rendered tristimulus values from video to that of ambient light sources to give proper colorimetry and appearance. For example, output from LED ambient light sources is often garish, with limited or skewed color gamuts—and generally, hue and chroma are difficult to assess and reproduce. For example, U.S. Pat. No. 6,611,297 to Akashi et al. deals with realism in ambient lighting, but no specific method is given to insure correct and pleasing chromaticity, and the teaching of Akashi '297 does not allow for analyzing video in real time, but rather needs a script or the equivalent.

In addition, setting of ambient light sources using gamma corrected color spaces from video content often result in garish, bright colors. A more serious problem in the prior art is the large amount of transmitted information that is needed to drive ambient light sources as a function of real time video content, and to suit a desired fast-changing ambient light environment where good color matching is desired.

It is therefore advantageous to expand the possible gamut of colors produced by ambient lighting in conjunction with a typical tristimulus video display system. It is also desired to exploit characteristics of the human eye, such as changes in relative luminosity of different colors as a function of light levels, by modulating or changing color and light character delivered to the video user using an ambient lighting system that uses to good advantage compensating effects, sensitivities, and other peculiarities of human vision.

It is also advantageous to create a quality ambient atmosphere free from the effects of gamma-induced distortion. It is further desired to be able to provide a method for providing emulative ambient lighting through dominant color extracts drawn from selected video regions using an economical data stream that encodes average or characterized color values. It is yet further desired to reduce the required size of such a datastream further.

Information about video and television engineering, compression technologies, data transfer and encoding, human vision, color science and perception, color spaces, colorimetry and image rendering, including video reproduction, can be found in the following references which are hereby incorporated herein in their entirety: ref[1] Color Perception, Alan R. Robertson, Physics Today, December 1992, Vol 45, No 12, pp. 24-29; ref[2] The Physics and Chemistry of Color, 2ed, Kurt Nassau, John Wiley & Sons, Inc., New York© 2001; ref[3] Principles of Color Technology, 3ed, Roy S. Berns, John Wiley & Sons, Inc., New York, © 2000; ref[4] Standard Handbook of Video and Television Engineering, 4ed, Jerry Whitaker and K. Blair Benson, McGraw-Hill, New York© 2003.

Methods given for various embodiments of the invention include using pixel level statistics or the equivalent to determine or extract, one or more dominant colors in a way which presents as little computational load as possible, but at the same time, provides for pleasing and appropriate chromaticities selected to be dominant colors.

The invention relates to a method for dominant color extraction from video content encoded in a rendered color space to produce a dominant color for emulation by an ambient light source. Methods steps include [1] quantizing the rendered color space by quantizing at least some pixel chromaticities from the video content in the rendered color space to form a distribution of assigned colors; [2] performing dominant color extraction from the distribution of assigned colors to produce a dominant color by extracting any of: [a] a mode of the assigned colors; [b] a median of the assigned colors; [c] a weighted average by chromaticity of the assigned colors; [d] a weighted average using a weighting function; and then, [3] transforming the dominant color from the rendered color space to a second rendered color space so formed as to allow driving the ambient light source.

The quantizing of the pixel chromaticities (or the rendered color space) can be done by a number of methods (see Definition section), where the goal is ease the computational burden by seeking a reduction in possible color states, such as resulting from assignment of a larger number of chromaticities (e.g., pixel chromaticities) to a smaller number of assigned chromaticities or colors; or a reduction in pixel numbers by a selection process that picks out selected pixels; or binning to produce representative pixels or superpixels.

If this quantizing of the rendered color space is performed in part by binning the pixel chromaticities into at least one superpixel, the superpixel thus produced can be of a size, orientation, shape, or location formed in conformity with an image feature. Assigned colors used in the quantization process can be selected to be a regional color vector that is not necessarily in the rendered color space, such as in the second rendered color space.

Once a dominant color is chosen from the distribution of assigned colors, one can then go backwards, so to speak, to obtain actual pixel chromaticities to refine the dominant color. For example, one can establish at least one color of interest in the distribution of assigned colors and extract pixel chromaticities assigned thereto to derive a true dominant color to be designated as the dominant color. Thus, while the assigned colors can be a crude approximation of video content, the true dominant color can provide the correct chromaticity for ambient distribution, while still saving on computation that would otherwise be required. Also, the dominant color can comprise a pallet of dominant colors.

Other possible embodiments for transformation step [3] include [3a] transforming the dominant color from the rendered color space to an unrendered color space; and [3b] transforming the dominant color from the unrendered color space to the second rendered color space. This can additionally comprise matrix transformations of primaries of the rendered color space and second rendered color space to the unrendered color space using first and second tristimulus primary matrices; and deriving a transformation of the color information into the second rendered color space by matrix multiplication of the primaries of the rendered color space, the first tristimulus matrix, and the inverse of the second tristimulus matrix.

The pixel chromaticities of step [1] can be obtained from an extraction region, and an added step [4] can include broadcasting ambient light of the dominant color from the ambient light source adjacent the extraction region.

The possible weighting function of step [2] can allow extracting a plurality of pixel chromaticities from an image feature, and past video frames can guide the selection of dominant colors in future video frames. Any extraction region can be chosen to be an image feature extracted from a video frame.

These steps can be combined in many ways, and the unrendered color space can be one of CIE XYZ; ISO RGB defined in ISO Standard 17321; Photo YCC; CIE LAB; or any other unrendered space; and steps [1], [2], and [3] can be substantially synchronous with the video signal, with ambient light broadcast from or around the video display using the color information in the second rendered color space.

BRIEF DESCRIPTION OF THE DRAWINGS

FIG. 5 shows a prior art matrix equation to transform rendered primaries RGB into unrendered color space XYZ;

FIGS. 6 and 7 show matrix equations for mapping video and ambient lighting rendered color spaces, respectively, into unrendered color space;

FIG. 8 shows a solution using known matrix inversion to derive ambient light tristimulus values R'G'B' from unrendered color space XYZ;

FIGS. 9-11 show prior art derivation of tristimulus primary matrix M using a white point method;

FIGS. 19 and 20 show process steps for color information extraction and processing for the invention;

FIG. 25 shows regional color vectors and their colors or chromaticity coordinates on a standard Cartesian CIE color map, where one color vector lies outside the gamut of colors obtainable by PAL/SECAM, NTSC, and Adobe RGB color production standards;

FIG. 31 gives a schematic representation to show establishing a color of interest in a distribution of assigned colors and then extracting pixel chromaticities assigned thereto to derive a true dominant color to be designated as a dominant color;

FIG. 32 shows schematically that dominant color extraction according to the invention can be performed numerous times or separately in parallel to provide a pallet of dominant colors;

FIG. 33 shows the simple front surface view of a video display as shown in FIG. 1, showing an example of unequal weighting given to a preferred spatial region for the methods demonstrated in FIGS. 29 and 30;

FIG. 34 gives a simple front surface view of a video display as shown in FIG. 33, showing schematically an image feature extracted for the purpose of dominant color extraction according to the invention;

FIG. 35 gives a schematic representation of another embodiment of the invention whereby video content decoded into a set of frames allows that a dominant color of one frame is obtained at least in part by relying upon a dominant color from a previous frame;

FIG. 36 shows process steps for an abridged procedure for choosing a dominant color according to the invention.

DEFINITIONS

Figure 1:
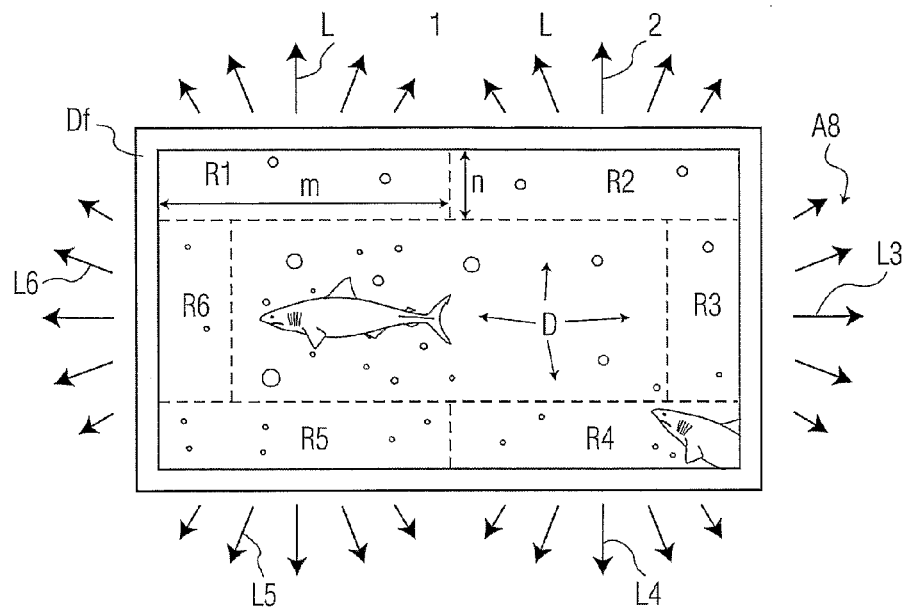
FIG. 1 shows a simple front surface view of a video display showing color information extraction regions and associated broadcasting of ambient light from six ambient light sources according to the invention.

The following definitions shall be used throughout:

Ambient light source—shall, in the appended claims, include any lighting production circuits or drivers needed to effect light production.

Ambient space—shall connote any and all material bodies or air or space external to a video display unit.

Assigned color distribution—shall denote a set of colors chosen to represent (e.g., for computational purposes) the full ranges of pixel chromaticities found in a video image or in video content.

Chrominance—shall, in the context of driving an ambient light source, denote a mechanical, numerical, or physical way of specifying the color character of light produced, and shall not imply a particular methodology, such as that used in NTSC or PAL television broadcasting.

Color information—shall include either or both of chrominance and luminance, or functionally equivalent quantities.

Computer—shall include not only all processors, such as CPU's (Central Processing Units) that employ known architectures, but also any intelligent device that can allow coding, decoding, reading, processing, execution of setting codes or change codes, such as digital optical devices, or analog electrical circuits that perform the same functions.

Dominant color—shall denote . . . .

Extraction region—shall include any subset of an entire video image or frame.

Frame—shall include time-sequential presentations of image information in video content, consistent with the use of the term frame in industry, but shall also include any partial (interlaced) or complete image data used to convey video content at any moment or at regular intervals.

Goniochromatic—shall refer to the quality of giving different color or chromaticity as a function of viewing angle or angle of observation, such as produced by iridescence.

Goniophotometric—shall refer to the quality of giving different light intensity, transmission and/or color as a function of viewing angle or angle of observation, such as found in pearlescent, sparkling or retroreflective phenomena.

Interpolate—shall include linear or mathematical interpolation between two sets of values, as well as functional prescriptions for setting values between two known sets of values.

Light character—shall mean, in the broad sense, any specification of the nature of light such as produced by an ambient light source, including all descriptors other than luminance and chrominance, such as the degree of light transmission or reflection; or any specification of goniophotometric qualities, including the degree to which colors, sparkles, or other known phenomena are produced as a function of viewing angles when observing an ambient light source; a light output direction, including directionality as afforded by specifying a Poynting or other propagation vector; or specification of angular distribution of light, such as solid angles or solid angle distribution functions. It can also include a coordinate or coordinates to specify locations on an ambient light source, such as element pixels or lamp locations.

Luminance—shall denote any parameter or measure of brightness, intensity, or equivalent measure, and shall not imply a particular method of light generation or measurement, or psycho-biological interpretation.

Pixel—shall refer to actual or virtual video picture elements, equivalent information which allows derivation of pixel information.

Quantize Color Space—in the specification and in the context of the appended claims, shall refer to a reduction in possible color states, such as resulting from assignment of a larger number of chromaticities (e.g., pixel chromaticities) to a smaller number of assigned chromaticities or colors; or a reduction in pixel numbers by a selection process that picks out selected pixels; or binning to produce representative pixels or superpixels.

Rendered color space—shall denote an image or color space captured from a sensor, or specific to a source or display device, which is device and image-specific. Most RGB color spaces are rendered image spaces, including the video spaces used to drive video display D. In the appended claims, both the color spaces specific to the video display and the ambient light source 88 are rendered color spaces.

Transforming color information to an unrendered color space—in the appended claims shall comprise either direct transformation to the unrendered color space, or use or benefit derived from using inversion of a tristimulus primary matrix obtained by transforming to the unrendered color space (e.g., $(M_2)^{-1}$ as shown in FIG. 8).

Unrendered color space—shall denote a standard or non-device-specific color space, such as those describing original image colorimetry using standard CIE XYZ; ISO RGB, such as defined in ISO 17321 standards; Photo YCC; and the CIE LAB color space.

Video—shall denote any visual or light producing device, whether an active device requiring energy for light production, or any transmissive medium which conveys image information, such as a window in an office building, or an optical guide where image information is derived remotely.

Video signal—shall denote the signal or information delivered for controlling a video display unit, including any audio portion thereof. It is therefore contemplated that video content analysis includes possible audio content analysis for the audio portion. Generally, a video signal can comprise any type of signal, such as radio frequency signals using any number of known modulation techniques; electrical signals, including analog and quanitized analog waveforms; digital (electrical) signals, such as those using pulse-width modulation, pulse-number modulation, pulse-position modulation, PCM (pulse code modulation) and pulse amplitude modulation; or other signals such as acoustic signals, audio signals, and optical signals, all of which can use digital techniques. Data that is merely sequentially placed among or with other information, such as in computer-based applications, can be used as well.

Weighted—shall refer to any equivalent method to those given here for giving preferential status or higher mathematical weights to certain chromaticities and/or spatial positions.

DETAILED DESCRIPTION

Ambient light derived from video content according to the invention is formed to allow, if desired, a high degree of fidelity to the chromaticity of original video scene light, while maintaining a high degree of specificity of degrees of freedom for ambient lighting with a low required computational burden. This allows ambient light sources with small color gamuts and reduced luminance spaces to emulate video scene light from more advanced light sources with relatively large colors gamuts and luminance response curves. Possible light sources for ambient lighting can include any number of known lighting devices, including LEDs (Light Emitting Diodes) and related semiconductor radiators; electroluminescent devices including non-semiconductor types; incandescent lamps, including modified types using halogens or advanced chemistries; ion discharge lamps, including fluorescent and neon lamps; lasers; light sources that are modulated, such as by use of LCDs (liquid crystal displays) or other light modulators; photoluminescent emitters, or any number of know n controllable light sources, including arrays that functionally resemble displays.

The description given here shall relate in part at first to color information extraction from video content, and later, to extraction methods to derive dominant or true colors that can represent video images or scenes.

Now referring to FIG. 1, a simple front surface view of a video display D according to the invention is shown for illustrative purposes only. Display D can comprise any of a number of known devices which decode video content from a rendered color space, such as an NTSC, PAL or SECAM broadcast standard, or an rendered RGB space, such as Adobe RGB. Display D can comprise color information extraction regions R1, R2, R3, R4, R5, and R6 whose borders can depart from those illustrated. The color information extraction regions are arbitrarily pre-defined and are to be characterized for the purpose of producing characteristic ambient light A8, such as via back-mounted controllable ambient lighting units (not shown) which produce and broadcast ambient light L1, L2, L3, L4, L5, and L6 as shown, such as by partial light spillage to a wall (not shown) on which display D is mounted. Alternatively, a display frame Df as shown can itself also comprise ambient lighting units which display light in a similar manner, including outward toward a viewer (not shown). If desired, each color information extraction region R1-R6 can influence ambient light adjacent itself. For example, color information extraction region R4 can influence ambient light L4 as shown.

Figure 2:
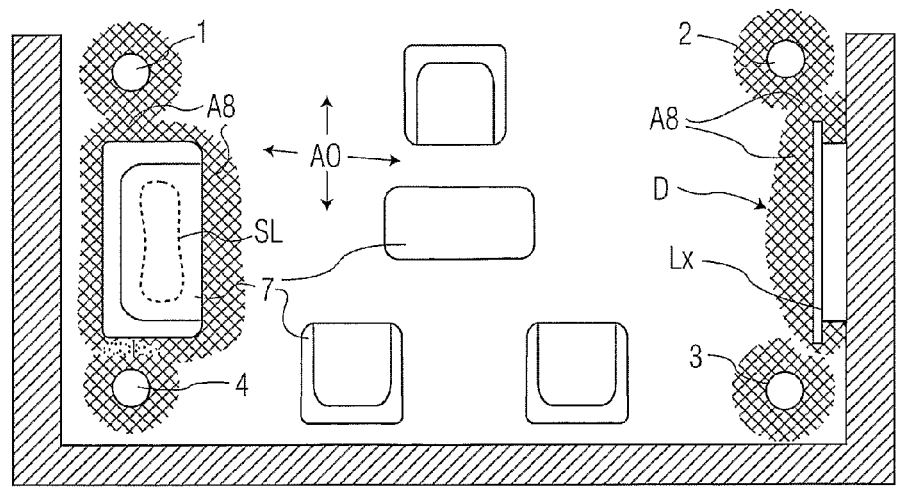
FIG. 2 shows a downward view—part schematic and part cross-sectional—of a room in which ambient light from multiple ambient light sources is produced using the invention.

Now referring to FIG. 2, a downward view—part schematic and part cross-sectional—is shown of a room or ambient space AO in which ambient light from multiple ambient light sources is produced using the invention. In ambient space AO is arranged seating and tables 7 as shown which are arrayed to allow viewing of video display D. In ambient space AO are also arrayed a plurality of ambient light units which are optionally controlled using the instant invent ion, including light speakers 1-4 as shown, a sublight SL under a sofa or seat as shown, as well as a set of special emulative ambient light units arrayed about display D, namely center lights that produce ambient light Lx like that shown in FIG. 1. Each of these ambient light units can emit ambient light A8, shown as shading in the figure.

In cooperation with the instant invention, one can produce ambient light from these ambient light units with colors or chromaticities derived from, but not actually broadcast by video display D. This allows exploiting characteristics of the human eye and visual system. It should be noted that the luminosity function of the human visual system, which gives detection sensitivity for various visible wavelengths, changes as a function of light levels.

For example, scotopic or night vision relying on rods tends to be more sensitive to blues and greens. Photopic vision using cones is better suited to detect longer wavelength light such as reds and yellows. In a darkened home theatre environment, such changes in relative luminosity of different colors as a function of light level can be counteracted somewhat by modulating or changing color delivered to the video user in ambient space. This can be done by subtracting light from ambient light units such as light speakers 1-4 using a light modulator (not shown) or by use of an added component in the light speakers, namely a photoluminescent emitter to further modify light before ambient release. The photoluminescent emitter performs a color transformation by absorbing or undergoing excitation from incoming light from light source and then re-emitting that light in higher desired wavelengths. This excitation and re-emission by a photoluminescent emitter, such as a fluorescent pigment, can allow rendering of new colors not originally present in the original video image or light source, and perhaps also not in the range of colors or color gamut inherent to the operation of the display D. This can be helpful for when the desired luminance of ambient light Lx is low, such as during very dark scenes, and the desired level of perception is higher than that normally achieved without light modification.

The production of new colors can provide new and interesting visual effects. The illustrative example can be the production of orange light, such as what is termed hunter's orange, for which available fluorescent pigments are well known (see ref[2]). The example given involves a fluorescent color, as opposed to the general phenomenon of fluorescence and related phenomena. Using a fluorescent orange or other fluorescent dye species can be particularly useful for low light conditions, where a boost in reds and oranges can counteract the decreased sensitivity of scotopic vision for long wavelengths.

Fluorescent dyes that can be used in ambient light units can include known dyes in dye classes such as Perylenes, Naphthalimides, Coumarins, Thioxanthenes, Anthraquinones, Thioindigoids, and proprietary dye classes such as those manufactured by the Day-Glo Color Corporation, Cleveland, Ohio, USA. Colors available include Apache Yellow, Tigris Yellow, Savannah Yellow, Pocono Yellow, Mohawk Yellow, Potomac Yellow, Marigold Orange, Ottawa Red, Volga Red, Salmon Pink, and Columbia Blue. These dye classes can be incorporated into resins, such as PS, PET, and ABS using known processes.

Fluorescent dyes and materials have enhanced visual effects because they can be engineered to be considerably brighter than nonfluorescent materials of the same chromaticity. So-called durability problems of traditional organic pigments used to generate fluorescent colors have largely been solved in the last two decades, as technological advances have resulted in the development of durable fluorescent pigments that maintain their vivid coloration for 7-10 years under exposure to the sun. These pigments are therefore almost indestructible in a home theatre environment where UV ray entry is minimal.

Alternatively, fluorescent photopigments can be used, and they work simply by absorbing short wavelength light, and re-emitting this light as a longer wavelength such as red or orange. Technologically advanced inorganic pigments are now readily available that undergo excitation using visible light, such as blues and violets, e.g., 400-440 nm light.

Goniophotometric and goniochromatic effects can similarly be deployed to produce different light colors, intensity, and character as a function of viewing angles. To realize this effect, ambient light units 1-4 and SL and Lx can use known goniophotometric elements (not shown), alone, or in combination, such as metallic and pearlescent transmissive colorants; iridescent materials using well-known diffractive or thin-film interference effects, e.g., using fish scale essence; thin flakes of guanine; or 2-aminohypoxanthine with preservative. Diffusers using finely ground mica or other substances can be used, such as pearlescent materials made from oxide layers, bornite or peacock ore; metal flakes, glass flakes, or plastic flakes; particulate matter; oil; ground glass, and ground plastics.

Figures 3, 4:
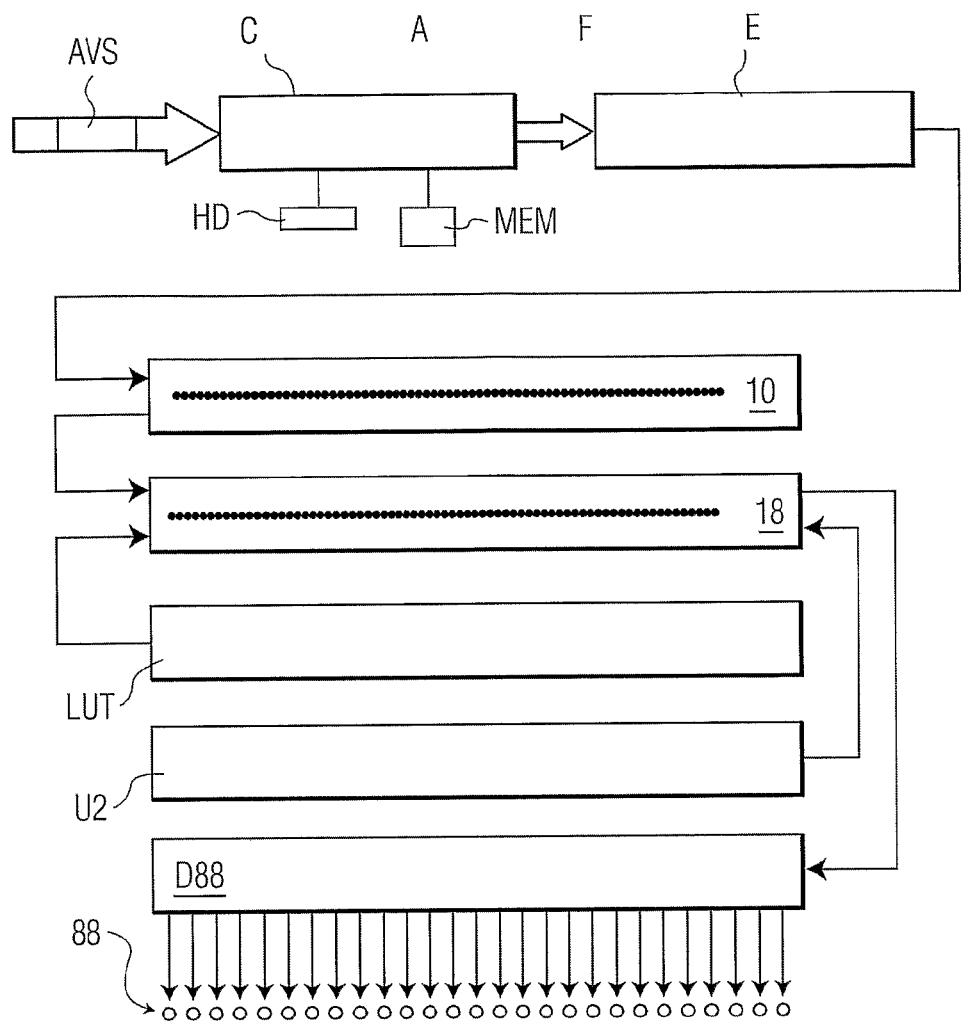
FIG. 3 shows a system according to the invention to extract color information and effect color space transformations to allow driving an ambient light source.
FIG. 4 shows an equation for calculating average color information from a video extraction region.

Now referring FIG. 3, a system according to the invention to extract color information (such as a dominant color or true color) and effect color space transformations to allow driving an ambient light source is shown. As a first step, color information is extracted from a video signal AVS using known techniques.

Video signal AVS can comprise known digital data frames or packets like those used for MPEG encoding, audio PCM encoding, etc. One can use known encoding schemes for data packets such as program streams with variable length data packets, or transport streams which divide data packets evenly, or other schemes such single program transport streams. Alternately, the functional steps or blocks given in this disclosure can be emulated using computer code and other communications standards, including asynchronous protocols.

As a general example, the video signal AVS as shown can undergo video content analysis CA as shown, possibly using known methods to record and transfer selected content to and from a hard disk HD as shown, and possibly using a library of content types or other information stored in a memory MEM as also shown. This can allow independent, parallel, direct, delayed, continuous, periodic, or aperiodic transfer of selected video content. From this video content one can perform feature extraction FE as shown, such as deriving color information (e.g., dominant color) generally, or from an image feature. This color information is still encoded in a rendered color space, and is then transformed to an unrendered color space, such as CIE XYZ using a RUR Mapping Transformation Circuit 10 as shown. RUR herein stands for the desired transformation type, namely, rendered-unrendered-rendered, and thus RUR Mapping Transformation Circuit 10 also further transforms the color information to a second rendered color space so formed as to allow driving said ambient light source or sources 88 as shown. The RUR transformation is preferred, but other mappings can be used, so long as the ambient lighting production circuit or the equivalent receives information in a second rendered color space that it can use.

RUR Mapping Transformation Circuit 10 can be functionally contained in a computer system which uses software to perform the same functions, but in the case of decoding packetized information sent by a data transmission protocol, there could be memory (not shown) in the circuit 10 which contains, or is updated to contain, information that correlates to or provides video rendered color space coefficients and the like. This newly created second rendered color space is appropriate and desired to drive ambient light source 88 (such as shown in FIGS. 1 and 2), and is fed using known encoding to ambient lighting production circuit 18 as shown. Ambient lighting production circuit 18 takes the second rendered color space information from RUR Mapping Transformation Circuit 10 and then accounts for any input from any user interface and any resultant preferences memory (shown together as U2) to develop actual ambient light output control parameters (such as applied voltages) after possibly consulting an ambient lighting (second rendered) color space lookup table LUT as shown. The ambient light output control parameters generated by ambient lighting production circuit 18 are fed as shown to lamp interface drivers D88 to directly control or feed ambient light source 88 as shown, which can comprise individual ambient light units 1-N, such as previously cited ambient light speakers 1-4 or ambient center lights Lx as shown in FIGS. 1 and 2.

To reduce any real time computational burden, the color information removed from video signal AVS can be abbreviated or limited. Now referring to FIG. 4, an equation for calculating average color information from a video extraction region is shown for discussion. It is contemplated, as mentioned below (see FIG. 18), that the video content in video signal AVS will comprise a series of time sequenced video frames, but this is not required. For each video frame or equivalent temporal block, one can extract average or other color information from each extraction region (e.g., R4). Each extraction region can be set to have a certain size, such as 100 by 376 pixels. Assuming, for example, a frame rate of 25 frame/sec, the resultant gross data for extraction regions R1-R6 before extracting an average (assuming only one byte needed to specify 8 bit color) would be 6×100×376×25 or 5.64 million bytes/sec for each video RGB tristimulus primary. This data stream is very large and would be difficult to handle at RUR Mapping Transformation Circuit 10, so extraction of an average color for each extraction region R1-R6 can be effected during Feature Extraction FE. Specifically, as shown one can sum the RGB color channel value (e.g., $R_{ij}$) for each pixel in each extraction region of m×n pixels, and divide by the number of pixels m×n to arrive at an average for each RGB primary, e.g., $R_{avg}$ for red, as shown. Thus repeating this summation for each RGB color channel, the average for each extraction region would be a triplet $R_{AVG}=|R_{avg}, G_{avg}, B_{avg}|$. The same procedure is repeated for all extraction regions R1-R6 and for each RGB color channel. The number and size of extractive regions can depart from that shown, and be as desired.

The next step of performing color mapping transformations by RUR Mapping Transformation Circuit 10 can be illustratively shown an d expressed using known tristimulus primary matrices, such as shown in FIG. 5, where a rendered tristimulus color space with vectors R, G, and B is transformed using the tristimulus primary matrix M with elements such as $X_{r,max}, Y_{r,max}, Z_{r,max}$ where $X_{r,max}$ is tristimulus value of the R primary at maximum output.

The transformation from a rendered color space to unrendered, device—independent space can be image and/or device specific—known linearization, pixel reconstruction (if necessary), and white point selection steps can be effected, followed by a matrix conversion. In this case, we simply elect to adopt the rendered video output space as a starting point for transformation to an unrendered color space colorimetry. Unrendered images need to go through additional transforms to make them viewable or printable, and the RUR transformation thus involves a transform to a second rendered color space.

As a first possible step, FIGS. 6 and 7 show matrix equations for mapping the video rendered color space, expressed by primaries R, G, and B and ambient lighting rendered color space, expressed by primaries R', G', and B' respectively, into unrendered color space X, Y, and Z as shown, where tristimulus primary matrix $M_1$ transforms video RGB into unrendered XYZ, and tristimulus primary matrix $M_2$ transforms ambient light source R'G'B' into unrendered XYZ color space as shown. Equating both rendered color spaces RGB and R'G'B' as shown in FIG. 8 allows matrix transformations of primaries RGB and R'G'B' of the rendered (video) color space and second rendered (ambient) color space to said unrendered color space (the RUR Mapping Transformation) using the first and second tristimulus primary matrices ($M_1$, $M_2$); and deriving a transformation of color information into the second rendered color space (R'G'B') by matrix multiplication of the RGB primaries of the rendered video color space, the first tristimulus matrix $M_1$, and the inverse of the second tristimulus matrix $(M_2)^{-1}$. While the tristimulus primary matrix f or known display devices is readily available, that for the ambient light source can be determined using a known white point method by those of ordinary skill in the art.

Now referring to FIGS. 9-11, prior art derivation of a generalized tristimulus primary matrix M using a white point method is shown. In FIG. 9, quantities like $S_r X_r$ represents the tristimulus value of each (ambient light source) primary at maximum output, with $S_r$ representing a white point amplitude, and $X_r$ representing the chromaticities of primary light produced by the (ambient) light source. Using the white point method, the matrix equation equating $S_r$ with a vector of the white point reference values using a known inverse of a light source chromaticity matrix as shown. FIG. 11 is an algebraic manipulation to remind that the white point reference values such as $X_w$ are a product of the white point amplitudes or luminances and the light source chromaticities. Throughout, the tristimulus value X is set equal to chromaticity x; tristimulus value Y is set equal to chromaticity y; and tristimulus value Z is defined to be set equal to 1−(x+y). The color primaries and reference white color components for the second rendered ambient light source color space can be acquired using known techniques, such as by using a color spectrometer.

Similar quantities for the first rendered video color space can be found. For example, it is known that contemporary studio monitors have slightly different standards in North America, Europe, and Japan. However, as an example, international agreement has been obtained on primaries for high-definition television (HDTV), and these primaries are closely representative of contemporary monitors in studio video, computing, and computer graphics. The standard is formally denoted ITU-R Recommendation BT.709, which contains the required parameters, where the relevant tristimulus primary matrix (M) for RGB is:

| 0.640 | 0.300 | 0.150 | Matrix M for ITU-R BT.709 |
|---|---|---|---|
| 0.330 | 0.600 | 0.060 | |
| 0.030 | 0.100 | 0.790 | | and the white point values are known as well.

Figure 12:
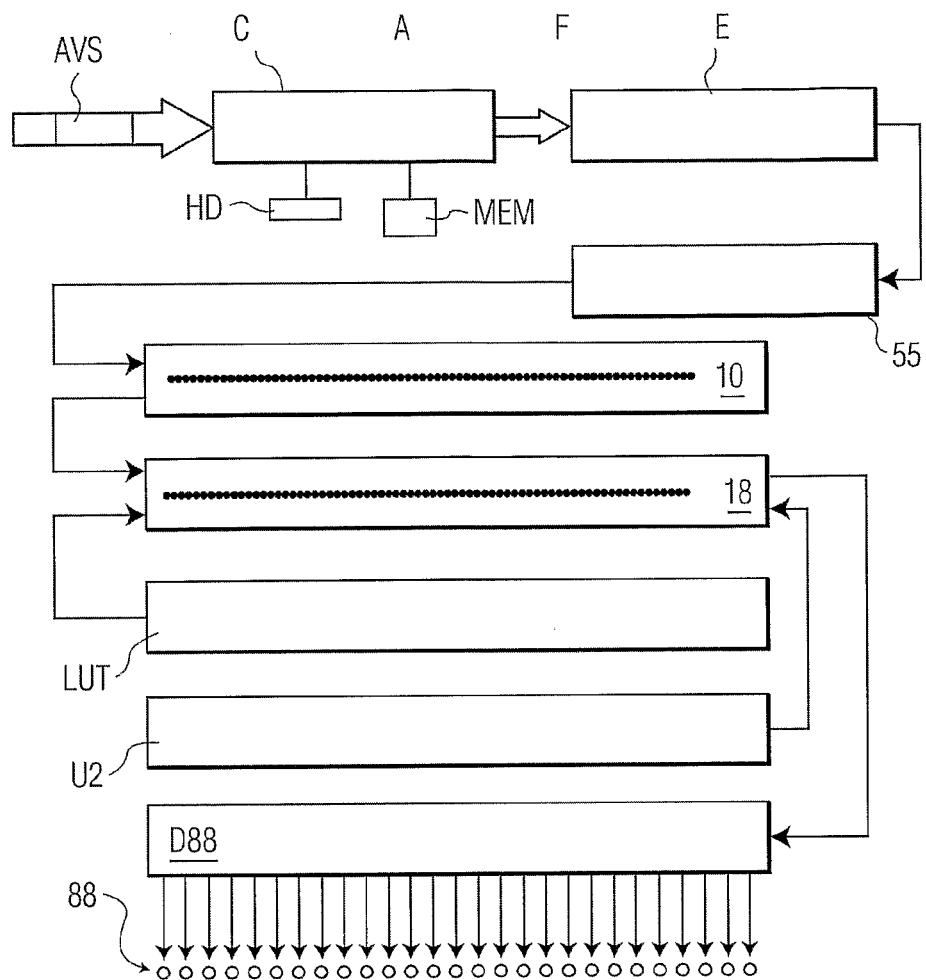
FIG. 12 shows a system similar to that shown in FIG. 3, additionally comprising a gamma correction step for ambient broadcast.

Now referring to FIG. 12, a system similar to that shown in FIG. 3 is shown, additionally comprising a gamma correction step 55 after feature extraction step FE as shown for ambient broadcast. Alternatively, gamma correction step 55 can be performed between the steps performed by RUR Mapping Transformation Circuit 10 and Ambient Lighting Production Circuit 18. Optimum gamma values for LED ambient light sources has been found to be 1.8, so a negative gamma correction to counteract a typical video color space gamma of 2.5 can be effected with the exact gamma value found using known mathematics.

Figure 13:
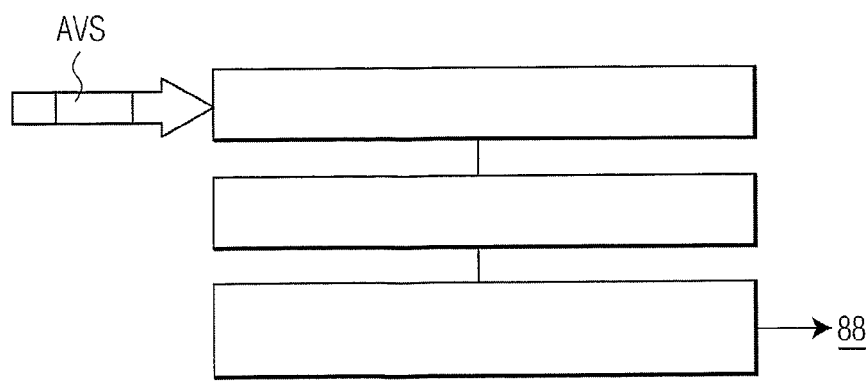
FIG. 13 shows a schematic for a general transformational process used in the invention.

Generally, RUR Mapping Transformation Circuit 10, which can be a functional block effected via any suitable known software platform, performs a general RUR transformation as shown in FIG. 13, where a schematic as shown takes video signal AVS comprising a Rendered Color Space such as Video RGB, and transforms it to an unrendered color space such as CIE XYZ; then to a Second Rendered Color Space (Ambient Light Source RGB). After this RUR transformation, ambient light sources 88 can be driven, aside from signal processing, as shown.

Figure 14:
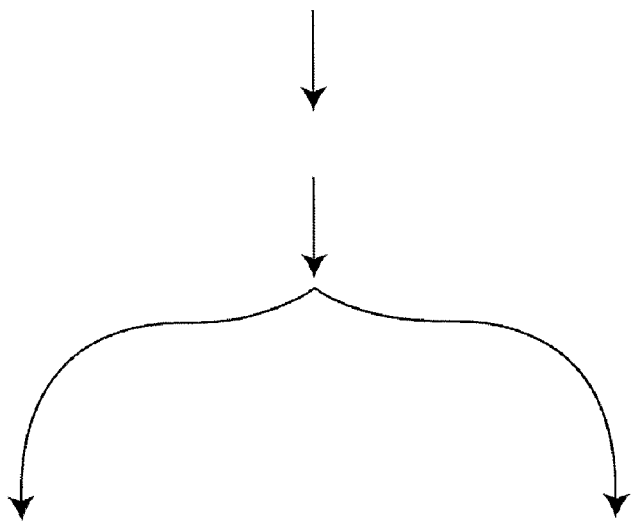
FIG. 14 shows process steps for acquiring transformation matrix coefficients for an ambient light source used by the invention.

FIG. 14 shows process steps for acquiring transformation matrix coefficients for an ambient light source used by the invention, where the steps include, as shown, Driving the ambient light unit(s); and Checking Output Linearity as known in the art. If the ambient light source primaries are stable, (shown on left fork, Stable Primaries), one can Acquire Transformation Matrix Coefficients Using a Color Spectrometer; whereas if the ambient light source primaries are not stable, (shown on right fork, Unstable Primaries), one can reset the previously given gamma correction (shown, Reset Gamma Curve).

Figure 15:
FIG. 15 shows process steps for estimated video extraction and ambient light reproduction using the invention.

In general, it is desirable, but not necessary, to extract color information from every pixel in extraction regions such as R4, and instead, if desired, polling of selected pixels can allow a faster estimation of average color, or a faster creation of a extraction region color characterization, to take place. FIG. 15 shows process steps for estimated video extraction and ambient light reproduction using the invention, where steps include [1] Prepare Colorimetric Estimate of Video Reproduction (From Rendered Color Space, e.g., Video RGB); [2] Transform to Unrendered Color Space; and [3] Transform Colorimetric Estimate for Ambient Reproduction (Second Rendered Color Space, e.g., LED RGB).

Figure 16:
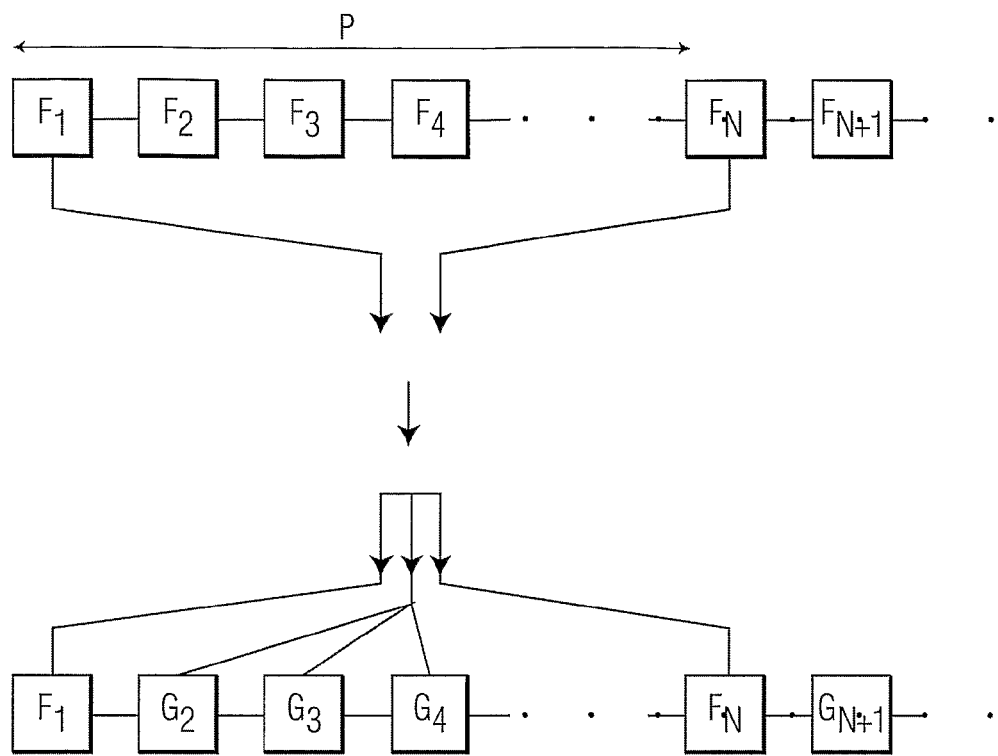
FIG. 16 shows a schematic of video frame extraction according to the invention.

It has been discovered that the required data bitstream required to support extraction and processing of video content (such as dominant color) from video frames (see FIG. 18 below) can be reduced according to the invention by judicious subsampling of video frames. Now referring to FIG. 16, a schematic of video frame extraction according to the invention is shown. A series of individual successive video frames F, namely frames $F_1$, $F_2$, $F_3$ and so on—such as individual interlaced or non-interlaced video frames specified by the NTSC, PAL, or SECAM standards—is shown. By doing content analysis and/or feature extraction—such as extracting dominant color information—from selected successive frames, such as frames $F_1$ and $F_N$, one can reduce data load or overhead while maintaining acceptable ambient light source responsiveness, realism, and fidelity. It has been found that N=10 gives good results, namely, subsampling 1 frame out of 10 successive frames can work. This provides a refresh period P between frame extractions of low processing overhead during which an interframe interpolation process can provide adequate approximation of the time development of chrominance changes in display D. Selected frames $F_1$ and $F_N$ are extracted as shown (EXTRACT) and intermediate interpolated values for chrominance parameters shown as $G_2$, $G_3$, $G_4$ provide the necessary color information to inform the previously cited driving process for ambient light source 88. This obviates the need to simply freeze or maintain the same color information throughout frames 2 through N−1. The interpolated values can be linearly determined, such as where the total chrominance difference between extracted frames $F_1$ and $F_N$ is spread over the interpolated frames G. Alternatively, a function can spread the chrominance difference between extracted frames $F_1$ and $F_N$ in any other manner, such as to suit higher order approximation of the time development of the color information extracted. The results of interpolation can be used by accessing in advance a frame F to influence interpolated frames (such as in a DVD player) or, alternatively, interpolation can be used to influence future interpolated frames without advance access to a frame F (such as in broadcast decoding applications).

Figure 17:
FIG. 17 shows process steps for abbreviated chrominance assessment according to the invention.

FIG. 17 shows process steps for abbreviated chrominance assessment according to the invention. Higher order analysis of frame extractions can larger refresh periods P and larger N than would otherwise be possible. During frame extraction, or during a provisional polling of selected pixels in extraction regions $R_x$, one can conduct an abbreviated chrominance assessment as shown that will either result in a delay in the next frame extraction, as shown on the left, or initiating a full frame extraction, as shown on the right. In either case, interpolation proceeds (Interpolate), with a delayed next frame extraction resulting in frozen, or incremented chrominance values being used. This can provide even more economical operation in terms of bitstream or bandwidth overhead.

Figure 18:
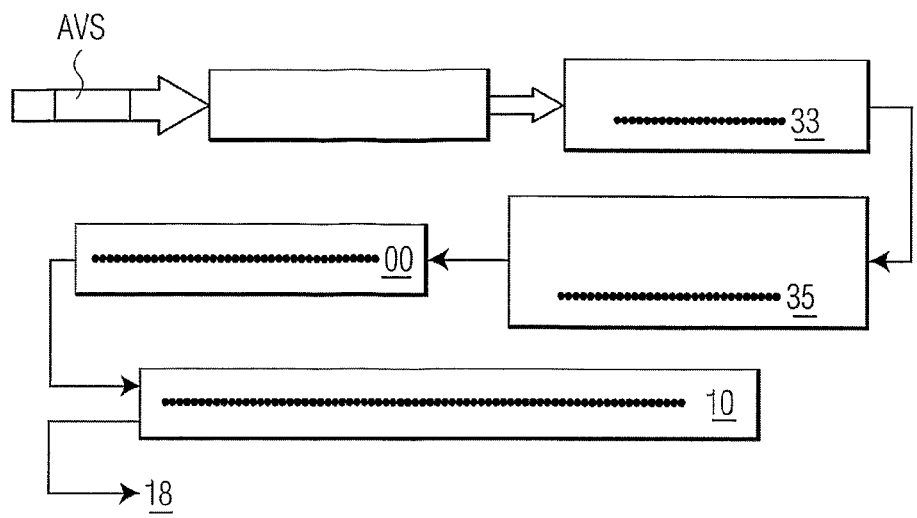
FIG. 18 shows an extraction step as shown in FIGS. 3 and 12, employing a frame decoder, setting a frame extraction rate and performing an output calculation for driving an ambient light source.

FIG. 18 shows the top of FIGS. 3 and 12, where an alternative extraction step is shown whereby a frame decoder FD is used, allowing for regional information from extraction regions (e.g, R1) is extracted at step 33 as shown. A further process or component step 35 includes assessing a chrominance difference, and using that information to set a video frame extraction rate, as indicated. A next process step of performing output calculations 00, such as the averaging of FIG. 4, or the dominant color extraction discussed below is performed as shown, prior to data transfer to Ambient Lighting and Production Circuit 18 previously shown.

Figure 19:

As shown in FIG. 19, general process steps for color information extraction and processing for the invention include acquiring an video signal AVS; extracting regional (color) information from selected video frames (such as previously cited $F_1$ and $F_N$); interpolating between the selected video frames; an RUR Mapping Transformation; optional gamma correction; and using this information to drive an ambient light source (88). As shown in FIG. 20, two additional process steps can be inserted after the regional extraction of information from selected frames: one can perform an assessment of the chrominance difference between selected frames $F_1$ and $F_N$, and depending on a preset criterion, one can set a new frame extraction rate as indicated. Thus, if a chrominance difference between successive frames $F_1$ and $F_N$ is large, or increasing rapidly (e.g., a large first derivative), or satisfies some other criterion, such as based on chrominance difference history, one can then increase the frame extraction rate, thus decreasing refresh period P. If, however, a chrominance difference between successive frames $F_1$ and $F_N$ is small, and is stable or is not increasing rapidly (e.g., a low or zero absolute first derivative), or satisfies some other criterion, such as based on chrominance difference history, one can then save on the required data bitstream required and decrease the frame extraction rate, thus increasing refresh period P.

Figure 21:
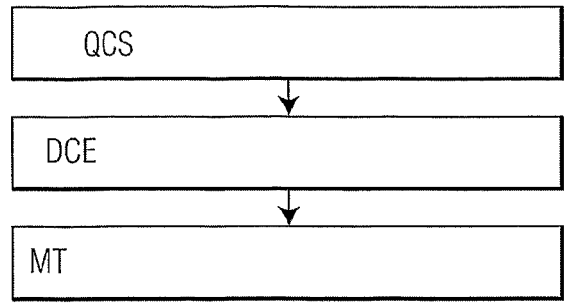
FIG. 21 shows a schematic for a general process according to the invention, including dominant color extraction and transformation to an ambient lighting color space.

Now referring to FIG. 21, a schematic is shown for a general process according to one aspect of the invention. As shown, and possibly to ease the computational burden, [1] the rendered color space corresponding to the video content is quantized (QCS Quantize Color Space), such as by using methods given below; [2] a dominant color (or a pallet of dominant colors) is chosen (DCE Dominant Color Extraction); and [3] and a color mapping transformation, such as the RUR Mapping Transformation (10) is performed (MT Mapping Transformation to R'G'B') to improve the fidelity, range and appropriateness of the ambient light produced.

Figure 22:
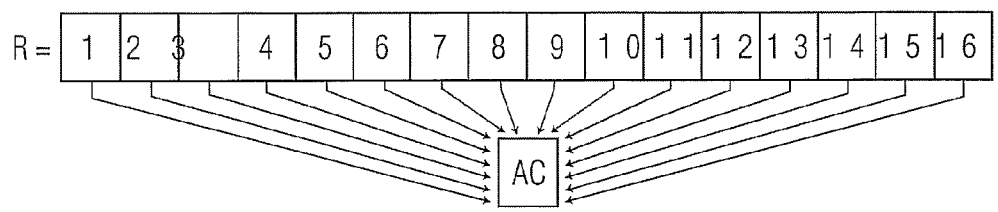
FIG. 22 shows schematically one possible method for quantizing pixel chromaticities from video content by assigning the pixel chromaticities to an assigned color.

The quantizing of the color space can be likened to reducing the number of possible color states and/or pixels to be surveyed, and can be effected using various methods. As an example, FIG. 22 shows schematically one possible method for quantizing pixel chromaticities from video content. Here, as shown, illustrative video primary values R ranging from values=1 to 16 are shown, and an arbitrary assignment is made for any of these primary values R to an assigned color AC as shown. Thus, for example, whenever any red pixel chromaticities or values=1 to 16 are encountered in video content, assigned color AC is substituted therefor, resulting in a reduction by a factor of 16 for the red primary alone in the number of colors needed in characterizing a video image. For all three primaries, such a reduction in possible color states can result in this example in a reduction by a factor of 16×16× 16, or 4096—in the number of colors used for computation. This can be especially useful to reduce computational load in determining dominant color in many video systems, such as those having 8 bit color which presents 256×256×256 or 16.78 million possible color states.

Figure 23:
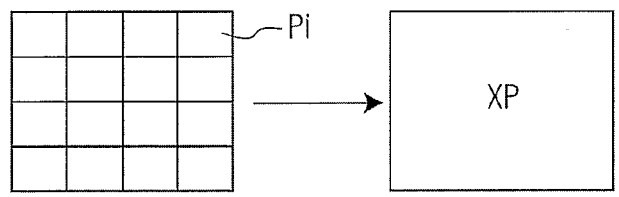
FIG. 23 shows schematically one example of quantizing by binning pixel chromaticities into a superpixel.

Another method for quantizing the video color space is given in FIG. 23, which shows schematically another example of quantizing the rendered color space by binning pixel chromaticities from a plurality of pixels Pi (e.g, 16 as shown) into a superpixel XP as shown. Binning is by itself a method whereby adjacent pixels are added together mathematically (or computationally) to form a superpixel which itself is used for further computation or representation. Thus, in a video format which normally has, for example, 0.75 million pixels, the number of superpixels chosen to represent the video content can reduce the number of pixels for computation to 0.05 million or any other desired smaller number.

Figure 24:
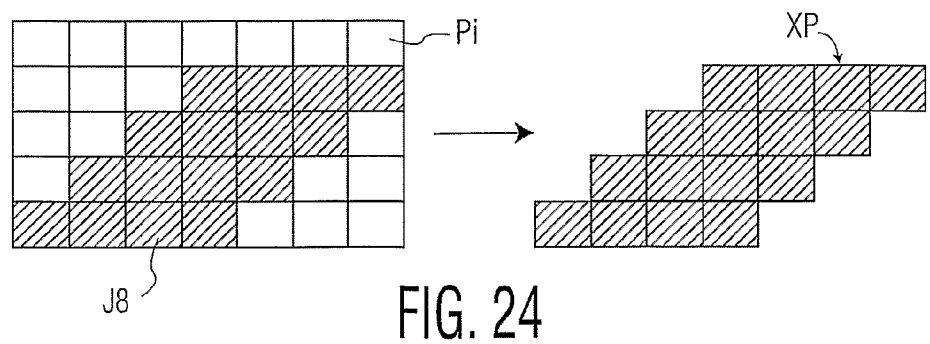
FIG. 24 shows schematically a binning process similar to of FIG. 23, but where size, orientation, shape, or location of the superpixel can be formed in conformity with an image feature.

The number, size, orientation, shape, or location of such superpixels XP can change as a function of video content. Where, for example, it is advantageous during feature extraction FE to insure that superpixels XP are drawn only from the image feature, and not from a border area or background, the superpixel(s) XP can be formed accordingly. FIG. 24 shows schematically a binning process similar to of FIG. 23, but where size, orientation, shape, or location of the superpixel can be formed in conformity with an image feature J8 as shown. Image feature J8 as shown is jagged or irregular in not having straight horizontal or vertical borders. As shown, superpixel XP is selected accordingly to mimic or emulate the image feature shape. In addition to having a customized shape, the location, size, and orientation of such superpixels can be influenced by image feature J8 using known pixel level computational techniques.

Quantization can take pixel chromaticities and substitutes assigned colors (e.g., assigned color AC) to same. Those assigned colors can be assigned at will, including using preferred color vectors. So, rather than using an arbitrary or uniform set of assigned colors, at least some video image pixel chromaticities can be assigned to preferred color vectors.

FIG. 25 shows regional color vectors and their colors or chromaticity coordinates on a standard Cartesian CIE x-y chromaticity diagram or color map. The map shows all known colors or perceivable colors at maximum luminosity as a function of chromaticity coordinates x and y, with nanometer light wavelengths and CIE standard illuminant white points shown for reference. Three regional color vectors V are shown on this map, where it can be seen that one color vector V lies outside the gamut of colors obtainable by PAL/SECAM, NTSC, and Adobe RGB color production standards (gamuts shown).

Figure 26:
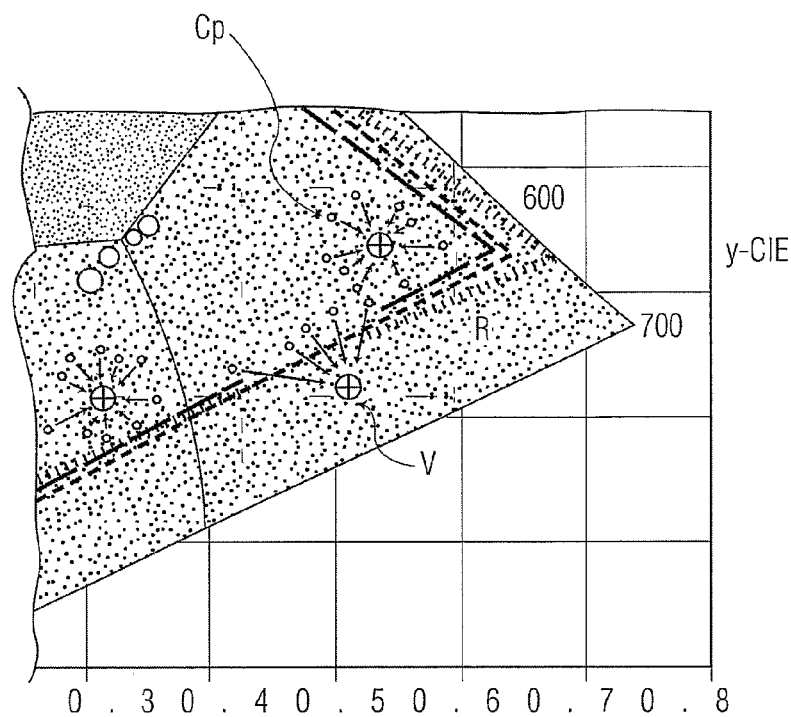
FIG. 26 shows a close-up of a portion of the CIE plot of FIG. 25, and additionally showing pixel chromaticities and their assignment to regional color vectors.

For clarity, FIG. 26 shows a close-up of a portion of the CIE plot of FIG. 25, and additionally showing pixel chromaticities Cp and their assignment to regional color vectors V. The criteria for assignment to a regional color vector can vary, and can include calculation of a Euclidean or other distance from a particular color vector V, using known calculational techniques. The color vector V which is labeled lies outside the rendered color space or color gamut of the display systems; this can allow that a preferred chromaticity easily produced by the ambient lighting system or light source 88 can become one of the assigned colors used in quantizing the rendered (video) color space.

Once a distribution of assigned colors is made using one or more of the methods given above, the next step is to perform a dominant color extraction from the distribution of assigned colors by extracting any of: [a] a mode of the assigned colors; [b] a median of the assigned colors; [c] a weighted average by chromaticity of the assigned colors; or [d] a weighted average using a weighting function.

Figure 27:
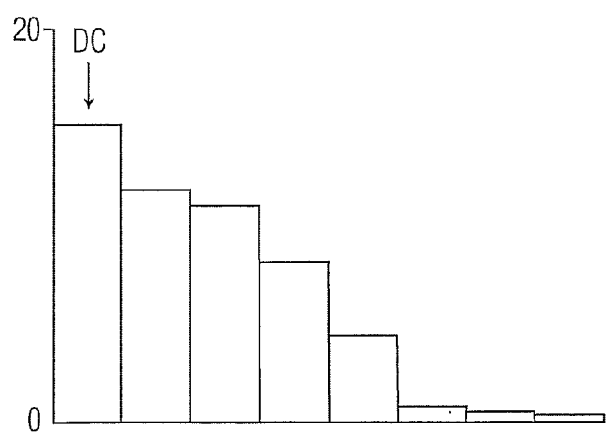
FIG. 27 shows a histogram that demonstrates a mode of an assigned color distribution according to one possible method of the invention.

For example, one can use a histogram method to select the assigned color which occurs with the highest frequency. FIG. 27 shows a histogram that gives the assigned pixel color or colors (Assigned Colors) occurring the most often (see ordinate, Pixel Percent), namely, the mode of the assigned color distribution. This mode or most often used assigned color can be selected as a dominant color DC (shown) for use or emulation by the ambient lighting system.

Figures 28, 29, 30:
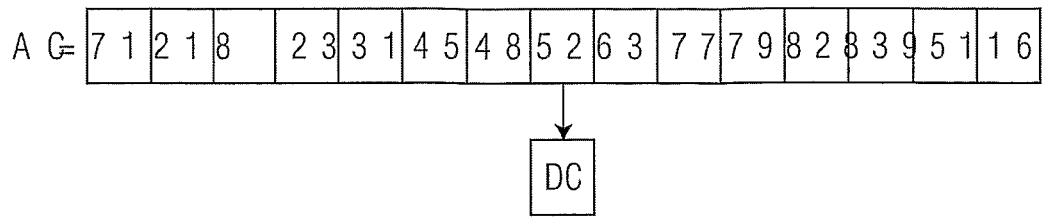
FIG. 28 shows schematically a median of an assigned color distribution according to one possible method of the invention.
FIG. 29 shows a mathematical summation for a weighted average by chromaticity of assigned colors according to one possible method of the invention.
FIG. 30 shows a mathematical summation for a weighted average by chromaticity of assigned colors using a weighting function according to one possible method of the invention.

Similarly, the median of the assigned color distribution can be selected to be, or help influence the selection of, the dominant color DC. FIG. 28 shows schematically a median of an assigned color distribution, where the median or middle value (interpolated for an even number of assigned colors) is shown selected as dominant color DC.

Alternatively, one can perform a summation over the assigned colors using a weighted average, so as to influence the dominant color(s) chosen, perhaps to better suit the strengths in the color gamut of the ambient lighting system. FIG. 29 shows a mathematical summation for a weighted average by chromaticity of the assigned colors. For clarity, a single variable R is shown, but any number of dimensions or coordinates (e.g., CIE coordinates x and y) can be used. Chromaticity variable R is summed as shown over pixel coordinates (or superpixel coordinates, if needed) i and j, running in this example between 1 and n and m, respectively. Chromaticity variable R is multiplied throughout the summation by a weighting function W with indices i and j as shown; the result is divided by the number of pixels n×m to obtain the weighted average.

A similar weighted average using a weighting function is given in FIG. 30, which is similar to FIG. 29, except that W as shown is now a function also of pixel locations i and j as shown, thus allowing a spatial dominance function. By weighting also for pixel position, the center or any other portion of display D can be emphasized during selection or extraction of dominant color DC, as discussed below.

The weighed summations can be performed by as given in the Extract Regional Information step 33 as given above, and W can be chosen and stored in any known manner. Weighting function W can be any function or operator, and thus, for example, can be unity for inclusion, and zero for exclusion, for particular pixel locations. Image features can be recognized using known techniques, and W can be altered accordingly to serve a larger purpose, as shown in FIG. 34 below.

Once an assigned color is chosen to be dominant using the above methods or any equivalent method, a better assessment of the chromaticity appropriate for expression by the ambient lighting system can be performed, especially since the computational steps required are much less than they would otherwise be if all chromaticities and/or all video pixels had to be considered. FIG. 31 gives an illustrative schematic representation to show establishing a color of interest in a distribution of assigned colors and then extracting pixel chromaticities assigned thereto to derive a true dominant color to be designated as a dominant color. As can be seen, pixel chromaticities Cp are assigned to two assigned colors AC; the assigned color AC shown at the bottom of the figure is not selected to be dominant, while the top assigned color is deemed dominant (DC) and is selected to be a color of interest COI as shown. One can then examine further the pixels that were assigned (or at least a portion thereof) to the assigned color AC deemed to be a color of interest COI, and by reading directly their chromaticity (such as using an average, as given in FIG. 4, or by performing the dominant color extraction steps already given on a small scale for this particular purpose), one can obtain a better rendition of the dominant color, shown here as true dominant color TDC. Any processing steps needed for this can be carried out using the steps and/or components given above, or by using a separate True Color Selector, which may be a known software program or subroutine or a task circuit or the equivalent.

As schematically shown in FIG. 32, dominant color extraction according to the invention can be performed numerous times or separately in parallel to provide a pallet of dominant colors, where dominant color DC can comprise dominant colors DC1+DC2+DC3 as shown.

As mentioned under FIG. 30, a weighting function or the equivalent can provide weighting by pixel position to allow special consideration or emphasis for certain displays regions. FIG. 33 shows the simple front surface view of a video display as shown in FIG. 1, and showing an example of unequal weighting given to pixels Pi in a preferred spatial region. For example, the central region C of the display can be weighted using a numerically large weight function W, while an extraction region (or any region, such as a scene background) can be weighted using a numerically small weight function w, as shown.

This weighting or emphasis can be applied to image features J8 as shown in FIG. 34, which gives a simple front surface view of a video display as shown in FIG. 33, and where an image feature 38 (a fish) is selected using known techniques by feature extractor step FE (see FIGS. 3 and 12). This image feature 38 can be the only video content used, or just part of the video content used, during dominant color extraction DCE as shown and described above.

Referring now to FIG. 35, it can be seen that it is also possible using the teachings given here to allow a dominant color selected for a video frame to be obtained at least in part by relying upon at least one dominant color from a previous frame. Frames $F_1$, $F_2$, $F_3$, and $F_4$ are shown schematically undergoing processing for obtain dominant color extraction DCE as shown, whose aim is to extract dominant colors DC1, DC2, DC3, and DC4 respectively as shown, and where by calculation, one can establish the dominant color chosen for a frame, shown here as DC4, as a function of dominant colors DC1, DC2, and DC3 as shown (DC4=F (DC1, DC2, DC3). This can allow either an abridged procedure for choosing dominant color DC4 for frame $F_4$, or a better informed one where the dominant colors chosen for previous frames $F_1$, $F_2$, and $F_3$ help influence the choice of dominant color DC4. This abridged procedure is shown in FIG. 36, where to reduce computational burden, a provisional dominant color extraction DC4* uses a colorimetric estimate, and then in the next step is aided by Dominant Colors Extracted from Previous Frames (or a single previous frame), helping prepare a choice for DC4 (Prepare DC4 Using Abridged Procedure).

Generally, ambient light source 88 can embody various diffuser effects to produce light mixing, as well as translucence or other phenomena, such as by use of lamp structures having a frosted or glazed surface; ribbed glass or plastic; or apertured structures, such as by using metal structures surrounding an individual light source. To provide interesting effects, any number of known diffusing or scattering materials or phenomena can be used, including that obtain by exploiting scattering from small suspended particles; clouded plastics or resins, preparations using colloids, emulsions, or globules 1-5 :m or less, such as less than 1 :m, including long-life organic mixtures; gels; and sols, the production and fabrication of which is known by those skilled in the art. Scattering phenomena can be engineered to include Rayleigh scattering for visible wavelengths, such as for blue production for blue enhancement of ambient light. The colors produced can be defined regionally, such as an overall bluish tint in certain areas or regional tints, such as a blue light-producing top section (ambient light L1 or L2).

Ambient lamps can also be fitted with a goniophotometric element, such as a cylindrical prism or lens which can be formed within, integral to, or inserted within a lamp structure. This can allow special effects where the character of the light produced changes as a function of the position of the viewer. Other optical shapes and forms can be used, including rectangular, triangular or irregularly-shaped prisms or shapes, and they can be placed upon or integral to an ambient light unit or units. The result is that rather than yielding an isotropic output, the effect gained can be infinitely varied, e.g., bands of interesting light cast on surrounding walls, objects, and surfaces placed about an ambient light source, making a sort of light show in a darkened room as the scene elements, color, and intensity change on a video display unit. The effect can be a theatrical ambient lighting element which changes light character very sensitively as a function of viewer position—such as viewing bluish sparkles, then red light—when one is getting up from a chair or shifting viewing position when watching a home theatre. The number and type of goniophotometric elements that can be used is nearly unlimited, including pieces of plastic, glass, and the optical effects produced from scoring and mildly destructive fabrication techniques. Ambient lamps can be made to be unique, and even interchangeable, for different theatrical effects. And these effects can be modulatable, such as by changing the amount of light allowed to pass through a goniophotometric element, or by illuminating different portions (e.g., using sublamps or groups of LEDs) of an ambient light unit.

In this way, ambient light produced at L3 to emulate extraction region R3 as shown in FIG. 1 can have a chromaticity that provides a perceptual extension of a phenomenon in that region, such as the moving fish as shown. This can multiply the visual experience and provide hues which are appropriate and not garish or unduly mismatched.

Video signal AVS can of course be a digital datastream and contain synchronization bits and concatenation bits; parity bits; error codes; interleaving; special modulation; burst headers, and desired metadata such as a description of the ambient lighting effect (e.g., "lightning storm"; "sunrise"; etc.) and those skilled in the art will realize that functional steps given here are merely illustrative and do not include, for clarity, conventional steps or data.

The User Interface & Preferences Memory as shown in FIGS. 3 and 12 can be used to change preferences regarding the system behavior, such as changing the degree of color fidelity to the video content of video display D desired; changing flamboyance, including the extent to which any fluorescent colors or out-of-gamut colors are broadcast into ambient space, or how quickly or greatly responsive to changes in video content the ambient light is, such as by exaggerating the intensity or other quality of changes in the light script command content. This can in dude advanced content analysis which can make subdued tones for movies or content of certain character. Video content containing many dark scenes in content can influence behavior of the ambient light source 88, causing a dimming of broadcast ambient light, while flamboyant or bright tones can be used for certain other content, like lots of flesh tone or bright scenes (a sunny beach, a tiger on savannah, etc.).

The description is given here to enable those of ordinary skill in the art to practice the invention. Many configurations are possible using the instant teachings, and the configurations and arrangements given here are only illustrative. In practice, the methods taught and claimed might appear as part of a larger system, such as an entertainment center or home theatre center.

It is well known that for the functions and calculations illustratively taught here can be functionally reproduced or emulated using software or machine code, and those of ordinary skill in the art will be able to use these teachings regardless of the way that the encoding and decoding taught here is managed. This is particularly true when one considers that it is not strictly necessary to decode video information into frames in order to perform pixel level statistics as given here.

Those with ordinary skill in the art will, based on these teachings, be able to modify the apparatus and methods taught and claimed here and thus, for example, rearrange steps or data structures to suit specific applications, and creating systems that may bear little resemblance to those chosen for illustrative purposes here.

The invention as disclosed using the above examples may be practiced using only some of the features mentioned above. Also, nothing as taught and claimed here shall preclude addition of other structures or functional elements.

Obviously, many modifications and variations of the present invention are possible in light of the above teaching. It is therefore to be understood that, within the scope of the appended claims, the invention may be practiced otherwise than as specifically described or suggested here.

We claim:

1. A method for dominant color extraction from video content encoded in a rendered color space (RGB) to produce a dominant color (DC) for emulation by an ambient light source (88), the method comprising the steps of:
    (1) quantizing at least some pixel chromaticities (Cp) from said video content in said rendered color space to form a distribution of assigned colors (AC);
    (2) performing dominant color extraction from said distribution of assigned colors to produce a dominant color by extracting any of: (a) a mode of said assigned colors, (b) a median of said assigned colors, (c) a weighted average by chromaticity of said assigned colors, and (d) a weighted average using a weighting function (W(i,j,R));
    (3) transforming said dominant color from said rendered color space to a second rendered color space (R'G'B') so formed as to allow driving said ambient light source.

2. The method as claimed in claim 1, wherein said quantizing comprises assigning a plurality of said pixel chromaticities (Cp) to one of said assigned colors.

3. The method as claimed in claim 1, wherein said quantizing comprises binning said pixel chromaticities into at least one superpixel (XP).

4. The method as claimed in claim 3, wherein any of a size, orientation, shape or location of said superpixel is formed in conformity with an image feature (J8).

5. The method as claimed in claim 3, wherein said method additionally comprises the step of:
    assigning a plurality of said pixel chromaticities (Cp) in said superpixel to one of said assigned colors.

6. The method as claimed in claim 1, wherein at least one of said assigned colors is a regional color vector (V) that is not necessarily in said rendered color space.

7. The method as claimed in claim 6, wherein said regional color vector lies in said second rendered color space.

8. The method as claimed in claim 1, wherein said method additionally comprises the step of:
    establishing at least one color of interest (COI) in said distribution of assigned colors and extracting pixel chromaticities assigned thereto to derive a true dominant color (TDC) to be designated as said dominant color.

9. The method as claimed in claim 8, wherein said pixel chromaticities are, at least in part, derived from a superpixel (XP) obtained by binning said pixel chromaticities.

10. The method as claimed in claim 1, wherein said dominant color comprises a pallet of dominant colors (DC1+DC2+DC3).

11. The method as claimed in claim 1, wherein said transforming step (3) comprises:
    (3a) transforming said dominant color from said rendered color space to an unrendered color space (XYZ); and
    (3b) transforming said dominant color from said unrendered color space to said second rendered color space.

12. The method as claimed in claim 11, wherein said step (3) of transforming additionally comprises:
    (3c) matrix transformations of primaries (RGB, R'G'B') of said rendered color space and second rendered color space to said unrendered color space using first and second tristimulus primary matrices ($M_1$, $M_2$); and
    deriving a transformation of said color information into said second rendered color space (R'G'B') by matrix multiplication of said primaries of said rendered color space, said first tristimulus matrix, and the inverse of said second tristimulus matrix ($M_2$)$^{-1}$.

13. The method as claimed in claim 1, wherein the pixel chromaticities of the quantizing step (1) are obtained from an extraction region (R1), and wherein said method additionally comprises the step of:
    (4) broadcasting ambient light (L1) of said dominant color from said ambient light source adjacent said extraction region.

14. The method as claimed in claim 1, wherein the quantizing step (1) additionally comprises decoding said video signal into a set of frames, and wherein a plurality of pixel chromaticities are obtained from an image feature (J8) extracted (FE) from one frame of said set of frames.

15. The method as claimed in claim 1, wherein said quantizing step (1) additionally comprises decoding said video signal into a set of frames, and wherein the dominant color of a frame ($F_4$) is obtained at least in part by relying upon at least one dominant color from a previous frame ($F_3$).

16. A method for dominant color extraction from video content encoded in a rendered color space (RGB) to produce a dominant color (DC) for emulation by an ambient light source (88), the method comprising the steps of:
    (1) decoding said video content in said rendered color space into a plurality of frames, and quantizing at least some pixel chromaticities (Cp) from an extraction region (R1) in one of said frames to form a distribution of assigned colors (AC);
(2) performing dominant color extraction from said distribution of assigned colors to produce a dominant color by extracting any of: (a) a mode of said assigned colors, (b) a median of said assigned colors, (c) a weighted average by chromaticity of said assigned colors, and (d) a weighted average using a weighting function (W(i,j,R));
(3a) transforming said dominant color from said rendered color space to an unrendered color space (XYZ);
(3b) transforming said dominant color from said unrendered color space to said second rendered, color space, assisted by
(3c) matrix transformations of primaries (RGB, R'G'B') of said rendered color space and second rendered color space to said unrendered color space using first and second tristimulus primary matrices ($M_1$, $M_2$); and
deriving a transformation of said color information into said second rendered color space (R'G'B') by matrix multiplication of said primaries of said rendered color space, said first tristimulus matrix, and the inverse of said second tristimulus matrix $(M_2)^{-1}$; and
(4) broadcasting ambient light (L1) of said dominant color from said ambient light source adjacent said extraction region.

17. The method as claimed in claim 16, wherein said extraction region is chosen to be an image feature (J8) extracted (FE) from one frame.

18. The method as claimed in claim 16, wherein said method additionally comprises the step of:
establishing at least one color of interest (COI) in said distribution of assigned colors and extracting pixel chromaticities assigned thereto to derive a true dominant color (TDC) to be designated as said dominant color.

19. The method as claimed in claim 16, wherein at least one of said assigned colors is a regional color vector (V) that is not necessarily in said rendered color space.

20. The method as claimed in claim 16, wherein said frames include a first and a second frame, and the dominant color of a frame ($F_4$) is obtained at least in part by relying upon at least one dominant color from a previous frame ($F_3$).

* * * * *